(12) United States Patent
Baba

(10) Patent No.: US 8,305,661 B2
(45) Date of Patent: Nov. 6, 2012

(54) IMAGE PROCESSING APPARATUS AND IMAGE PROCESSING METHOD

(75) Inventor: Hiroyuki Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 395 days.

(21) Appl. No.: 12/764,409

(22) Filed: Apr. 21, 2010

(65) Prior Publication Data

US 2010/0277777 A1  Nov. 4, 2010

(30) Foreign Application Priority Data

May 1, 2009  (JP) .................................. 2009-112010

(51) Int. Cl.
  *H04N 1/04* (2006.01)

(52) U.S. Cl. ......... 358/505; 358/474; 358/475; 358/496

(58) Field of Classification Search .................. 358/505, 358/474, 475, 496, 497, 498, 513, 442
See application file for complete search history.

(56) References Cited

U.S. PATENT DOCUMENTS 6,002,429 A * 12/1999 Ochi et al. ................. 348/220.1
7,010,176 B2 * 3/2006 Kusunoki ..................... 382/299

FOREIGN PATENT DOCUMENTS

JP  2006-165698  6/2006

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An image processing apparatus includes a reading speed changing unit to change a reading resolution of a manuscript in a vertical direction by changing a carrier linear speed of the manuscript or a moving speed of a reading carriage; a resolution changing unit to change a resolution in the vertical direction of image data of which reading resolution is changed; and a resolution instruction unit to calculate a threshold of a required resolution of an image to determine instruction contents for the reading speed changing unit and the resolution changing unit, based on a data size drawn from a maximum readout size of the manuscript in a main scanning direction and information to specify a pixel and data transfer capability of a data bus, and to provide a resolution for the reading speed changing unit and the resolution changing unit according to the calculated threshold of the required resolution.

9 Claims, 17 Drawing Sheets

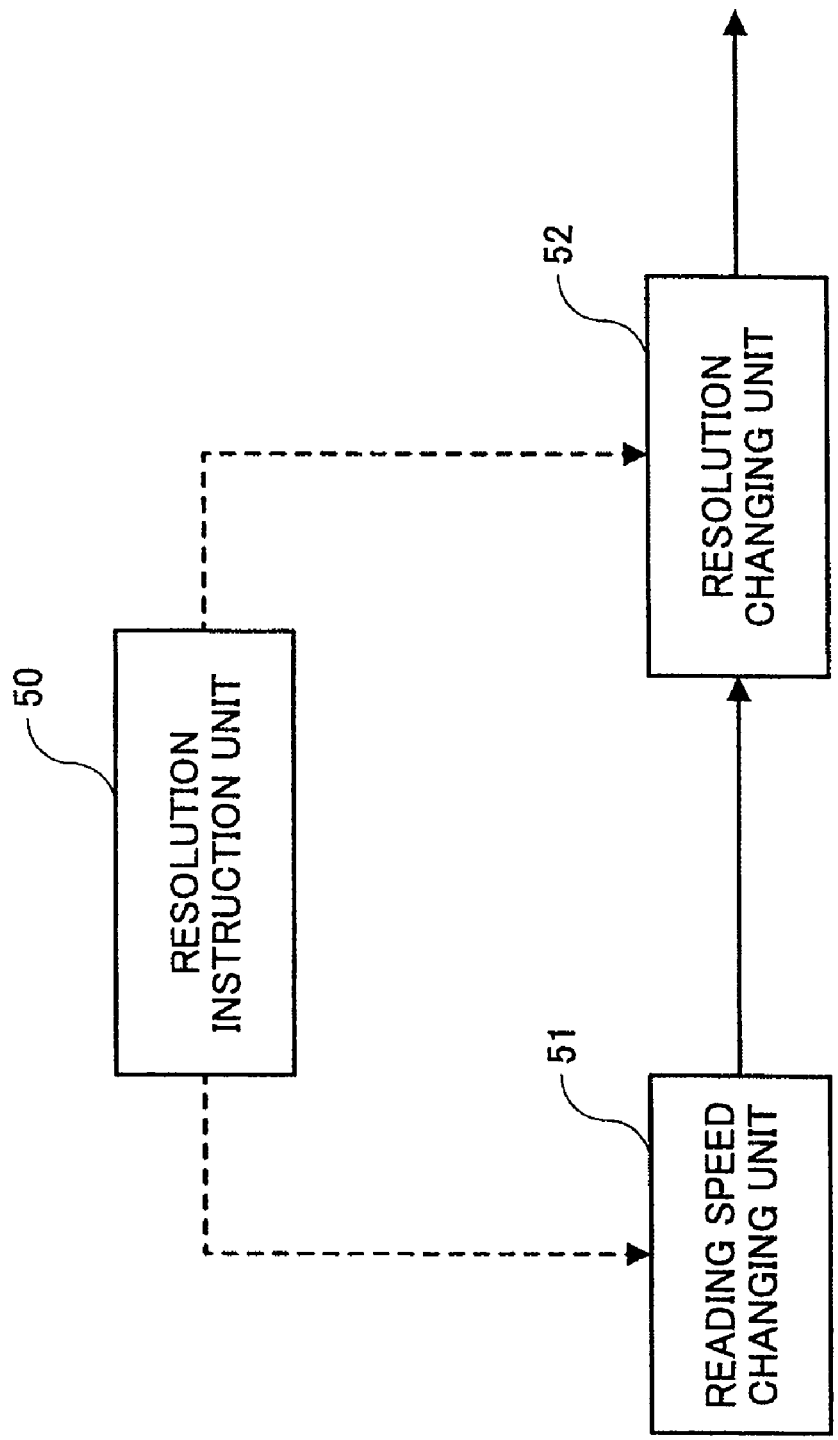

FIG.13

| REQUIRED RESOLUTION [dpi] | ELECTRONIC MAGNIFICATION CHANGE (1/n THINNING) | RESOLUTION CONVERSION [dpi] OF MAGNIFICATION CHANGE BY READING SPEED CHANGE UNIT | MAGNIFICATION CHANGE RATE [%] OF MAGNIFICATION CHANGE BY READING SPEED CHANGE UNIT | DATA SIZE [byte] OF ONE LINE | DATA SIZE [byte] TRANSFERRED AT ONE LINE INTERVALS (NUMBER OF ONE LINE DIVIDED BY n) |
|---|---|---|---|---|---|
| 100 — 179 | OFF (n=1) | 100.0 — 179.0 | 16.7% — 29.8% | 4677 — 8372 | 4677 — 8372 |
| 180 — 205 (DECELERATION AREA) | 1/2 (n=2) | 360.0 — 410.0 | 60.0% — 68.3% | 8419 — 9588 | 4209 — 4794 |
| 206 — 307 (DECELERATION AREA) | 1/3 (n=3) | 618.0 — 921.0 | 103.0% — 153.5% | 9635 — 14359 | 3212 — 4786 |
| 308 — 410 (DECELERATION AREA) | 1/4 (n=4) | 1232.0 — 1640.0 | 205.3% — 273.3% | 14406 — 19176 | 3601 — 4794 |
| 411 — 513 (DECELERATION AREA) | 1/5 (n=5) | 2055.0 — 2565.0 | 342.5% — 427.5% | 19223 — 23994 | 3845 — 4799 |
| 514 — 600 (DECELERATION AREA) | 1/6 (n=6) | 3084.0 — 3600.0 | 514.0% — 600.0% | 24041 — 28063 | 4007 — 4677 |

FIG.14

| REQUIRED RESOLUTION [dpi] | ELECTRONIC MAGNIFICATION CHANGE (1/n THINNING) | RESOLUTION CONVERSION [dpi] OF MAGNIFICATION CHANGE BY READING SPEED CHANGE UNIT | MAGNIFICATION CHANGE RATE [%] OF MAGNIFICATION CHANGE BY READING SPEED CHANGE UNIT | DATA SIZE [byte] OF ONE LINE | DATA SIZE [byte] TRANSFERRED AT ONE LINE INTERVALS (NUMBER OF ONE LINE DIVIDED BY n) |
|---|---|---|---|---|---|
| 100 — 229 | OFF (n=1) | 100.0 — 229.0 | 16.7% — 38.2% | 3654 — 8368 | 3654 — 8368 |
| 230 — 262 (DECELERATION AREA) | 1/2 (n=2) | 460.0 — 524.0 | 76.7% — 87.3% | 8404 — 9574 | 4202 — 4787 |
| 263 — 394 (DECELERATION AREA) | 1/3 (n=3) | 87.7 — 1182.0 | 14.6% — 197.0% | 9610 — 14397 | 3203 — 4799 |
| 395 — 410 (DECELERATION AREA) | 1/4 (n=4) | 1580.0 — 1640.0 | 263.3% — 273.3% | 14433 — 14982 | 3608 — 3745 |
| 411 — 600 (DECELERATION AREA) | 1/5 (n=5) | 2630.0 — 3000.0 | 438.3% — 500.0% | 19220 — 21924 | 3844 — 4385 |

FIG.15

| REQUIRED RESOLUTION [dpi] | ELECTRONIC MAGNIFICATION CHANGE (1/n THINNING) | RESOLUTION CONVERSION [dpi] OF MAGNIFICATION CHANGE BY READING SPEED CHANGE UNIT | MAGNIFICATION CHANGE RATE [%] OF MAGNIFICATION CHANGE BY READING SPEED CHANGE UNIT | DATA SIZE [byte] OF ONE LINE | DATA SIZE [byte] TRANSFERRED AT ONE LINE INTERVALS (NUMBER OF ONE LINE DIVIDED BY n) |
|---|---|---|---|---|---|
| 100 — 239 | OFF (n=1) | 100.0 — 239.0 | 16.7% — 39.8% | 3508 — 8733 | 3508 — 8733 |
| 240 — 273 (DECELERATION AREA) | 1/2 (n=2) | 480.0 — 546.0 | 80.0% — 91.0% | 8419 — 9576 | 4209 — 4788 |
| 274 — 410 (DECELERATION AREA) | 1/3 (n=3) | 91.3 — 1230.0 | 15.2% — 205.0% | 9612 — 14382 | 3204 — 4794 |
| 411 — 600 (DECELERATION AREA) | 1/4 (n=4) | 1644.0 — 2400.0 | 274.0% — 400.0% | 14417 — 21047 | 3604 — 5262 |

FIG.16

| REQUIRED RESOLUTION [dpi] | ELECTRONIC MAGNIFICATION CHANGE (1/n THINNING) | RESOLUTION CONVERSION [dpi] OF MAGNIFICATION CHANGE BY READING SPEED CHANGE UNIT | MAGNIFICATION CHANGE RATE [%] OF MAGNIFICATION CHANGE BY READING SPEED CHANGE UNIT | DATA SIZE [byte] OF ONE LINE | DATA SIZE [byte] TRANSFERRED AT ONE LINE INTERVALS (NUMBER OF ONE LINE DIVIDED BY n) |
|---|---|---|---|---|---|
| 100 — 600 | OFF | 100.0 — 600.0 | 16.7% — 100.0% | 3508 — 7016 | 3508 — 7016 |

IMAGE PROCESSING APPARATUS AND IMAGE PROCESSING METHOD

BACKGROUND OF THE INVENTION

1. Field of the Invention

The present invention relates to image processing apparatuses and image processing methods. More specifically, the present invention relates to an image processing apparatus and an image processing method configured to optimally transfer data in response to a transfer capability of a network.

2. Description of the Related Art

Conventionally, there are systems that transfer read data that are read from image processing apparatuses such as a digital copying machine, a facsimile machine, and an image scanner to another apparatus through a network such as a data bus. In such systems, optimizing a processing speed as a whole system is needed because a waiting time may occur until the systems transfer the read data to the apparatus for outputting, especially if a transferring speed of the network is slow.

Under the above mentioned conditions, for example, in a case of multifunction products in middle and low speed tiers, there are demands for cost reduction and improvement of readout productivity. On the other hand, if a low-cost controller of 32-bit bus is adopted for the multifunction products in the low or middle speed tiers for the cost reduction, data transfer capability to transfer the read data decreases. Moreover, if a reading line speed is increased and a reading cycle of a line is shortened, a margin of the data transfer capability decreases.

Here, if the multifunction products have enough data transfer capability proportional to the reading line speed, the above-mentioned problems do not occur. However, for example, under reading conditions of "an automatic color determination in 600 dpi resolution for A4 (which is a paper size of Japanese Industrial Standards) manuscript" or "a color Clear Write PDF (which is a type that divides a background photograph part and a foreground letter part, and compresses the parts by performing image processing suitable for each of the features; PDF stands for Portable Document Format) in 600 dpi resolution for A4 manuscript", an amount of the read data may exceed the data transfer capability. Furthermore, in order to meet these conditions, adopting a controller of a 64-bit bus that can transfer data at high speed causes a significant increase in cost.

Therefore, in a readout apparatus that performs readout under a readout condition beyond the transfer capability for a data amount to be transferred, a speed reduction control technique is known where it is determined whether the data amount is within the transfer capability before the readout, and the data transfer can be carried out by slowing the readout speed if the data transfer is impossible.

In addition, for example, as a unit that adjusts speeds of the apparatuses of the readout apparatus and an output device by considering a data transfer processing capability of the network, a control unit that controls a reading speed (i.e., mechanical variable magnification) of the readout apparatus and magnification change processing is described in Japanese Laid-open Patent Application Publication No. 2006-165698 (which is hereinafter called Patent Document 1).

Here, in Patent Document 1, availability of deceleration control is determined based on a data transfer size (i.e., amount). However, for example, there is a case where a size of set manuscripts to be read as data varies from manuscript to manuscript. In this case, adjusting the data transfer amount according to the manuscript size allows for optimal data transfer. To do this, however, because gaining the manuscript size before reading the manuscript is needed, it is impossible to preliminarily gain the manuscript size at a detection timing such as an automatic size detection, and to perform the deceleration control that adjusts the data transfer amount according to the manuscript size.

Moreover, since the deceleration control conditions vary according to data transfer circumstances, a magnification changing form varies according to the data amount of the data transfer through a network even if the same manuscript is read at the same resolution, by which every output image cannot have a same image quality.

SUMMARY OF THE INVENTION

Accordingly, embodiments of the present invention may provide a novel and useful image processing apparatus and a image processing method solving or reducing one or more of the above-described problems.

More specifically, the embodiments of the present invention may provide an image processing apparatus and an image processing method to optimally transfer data depending on the transfer capability of a network.

According to one embodiment of the present invention, an image processing apparatus is provided to optimally transfer data depending on the transfer capability of a network, the apparatus including:

a reading speed changing unit to change a reading resolution of a manuscript in a vertical direction by changing a carrier linear speed of the manuscript or a moving speed of a reading carriage to read the manuscript;

a resolution changing unit to change a resolution in the vertical direction of image data of which reading resolution is changed by the reading speed changing unit; and a resolution instruction unit to calculate a threshold of a required resolution of an image to determine instruction contents for the reading speed changing unit and the resolution changing unit, the threshold being calculated based on a data size drawn from a maximum readout size of the manuscript in a main scanning direction and information to specify a pixel and data transfer capability of a data bus to transfer the image data, and to provide an instruction on a resolution for the reading speed changing unit and the resolution changing unit according to the calculated threshold of the required resolution.

According to another embodiment of the present invention, an image processing method is provided to transfer image data of a manuscript according to a required resolution of an image to be output, the method including:

calculating a threshold of the required resolution of the image to determine a reading speed and a resolution of the image data in a vertical direction, the threshold being calculated based on a data size drawn from a maximum readout size of the manuscript in a main scanning direction and information to specify a pixel and data transfer capability of a data bus to transfer the image data;

changing a reading resolution of the manuscript in the vertical direction by changing a carrier linear speed of the manuscript or a moving speed of a reading carriage to read the manuscript, according to the calculated reading speed;

reading the manuscript to obtain the image data of the manuscript of the changed resolution;

changing the resolution in the vertical direction of the image data of which reading resolution is changed; and transferring the image data of which resolution in the vertical direction is changed by using the data bus.

Other objects, features and advantages of the present invention will become more apparent from the following detailed description when read in conjunction with the accompanying drawings.

BRIEF DESCRIPTION OF THE DRAWINGS

FIG. 12 is a block diagram showing a configuration of a resolution instruction unit of the embodiments;

FIG. 13 is a table for explaining a threshold of a magnification changing control of a first condition of the embodiment;

FIG. 14 is a table for explaining a threshold of a magnification changing control of a second condition of the embodiment;

FIG. 15 is a table for explaining a threshold of a magnification changing control of a third condition of the embodiment;

FIG. 16 is a table for explaining a threshold of a magnification changing control of a fourth condition of the embodiment.

DETAILED DESCRIPTION OF THE PREFERRED EMBODIMENTS

A description is given, with reference to the accompanying drawings, of embodiments of the present invention.

<Regarding the Present Invention>

In a case of reading image data such as a manuscript and transferring the read data through a network such as data bus, the present invention prevents a decrease in readout productivity when deceleration control of the read data is unnecessary. Also, the present invention makes it possible to read the manuscript by using the deceleration control even if the manuscript size is unknown before reading the manuscript, and to form the same quality of images without depending on the manuscript size when the readout resolution is the same. Hereinafter, a detailed description is given about the embodiment of the present invention.

<Configuration Diagram of Image Readout Apparatus>

Figure 1:
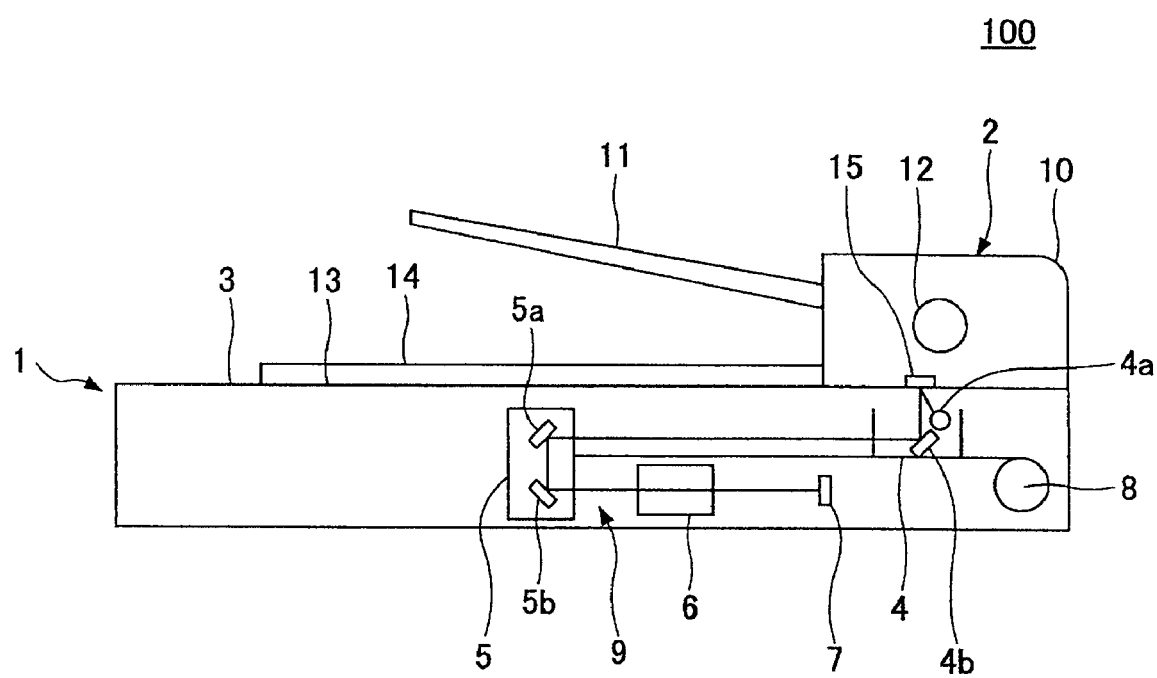
FIG. 1 is a configuration diagram showing an image readout apparatus of a color multifunction product of an embodiment of the present invention.

FIG. 1 is a configuration diagram of an image readout apparatus in a color multifunction product (which is hereinafter called MFP) of the present invention. As shown in FIG. 1, the image readout apparatus 100 is configured to include a readout apparatus body 1, a manuscript conveyance device 2, and a manuscript reading board 3.

The readout apparatus body 1 is provided with an exposure scanning optical system 9 inside. The exposure scanning optical system 9 includes a first traveling body 4 including a light source 4a constructed of a xenon lamp or a fluorescent bulb and a mirror 4b as a readout carriage, a second traveling body 5 including a mirror 5a and a mirror 5b, a lens 6, a one-dimensional photoelectric conversion element 7 (which is hereinafter called CCD) such as three-line CCD (i.e., Charge Coupled Device Image Sensor) for color reading, and a traveling body transfer stepping motor 8 to drive the first traveling body 4 and the second traveling body 5.

Moreover, the manuscript conveyance device 2 is configured to include a sheet through document feeder (which may be hereinafter called a SDF) unit 10 and a manuscript board 11. Inside the SDF unit 10, a manuscript conveyance stepping motor 12 is provided.

Furthermore, a manuscript holding plate 14 is rotatably installed on an upper part of the manuscript reading board 3, and the manuscript 13 is set under the manuscript holding board 14. Also, a reference white plate 15 for shading correction is disposed at an end of the manuscript reading board 3.

Here, the above-mentioned configuration, for example, is that of a general purpose digital scanner. For example, the manuscript 13 set at the SDF unit 10 is conveyed by the manuscript conveyance stepping motor 12 at a predetermined speed as described later, and for example, image data and the like printed on the manuscript are read by the exposure scanning optical system 9.

<Control Block of Electric Component Part of Image Readout Apparatus>

Figure 2:
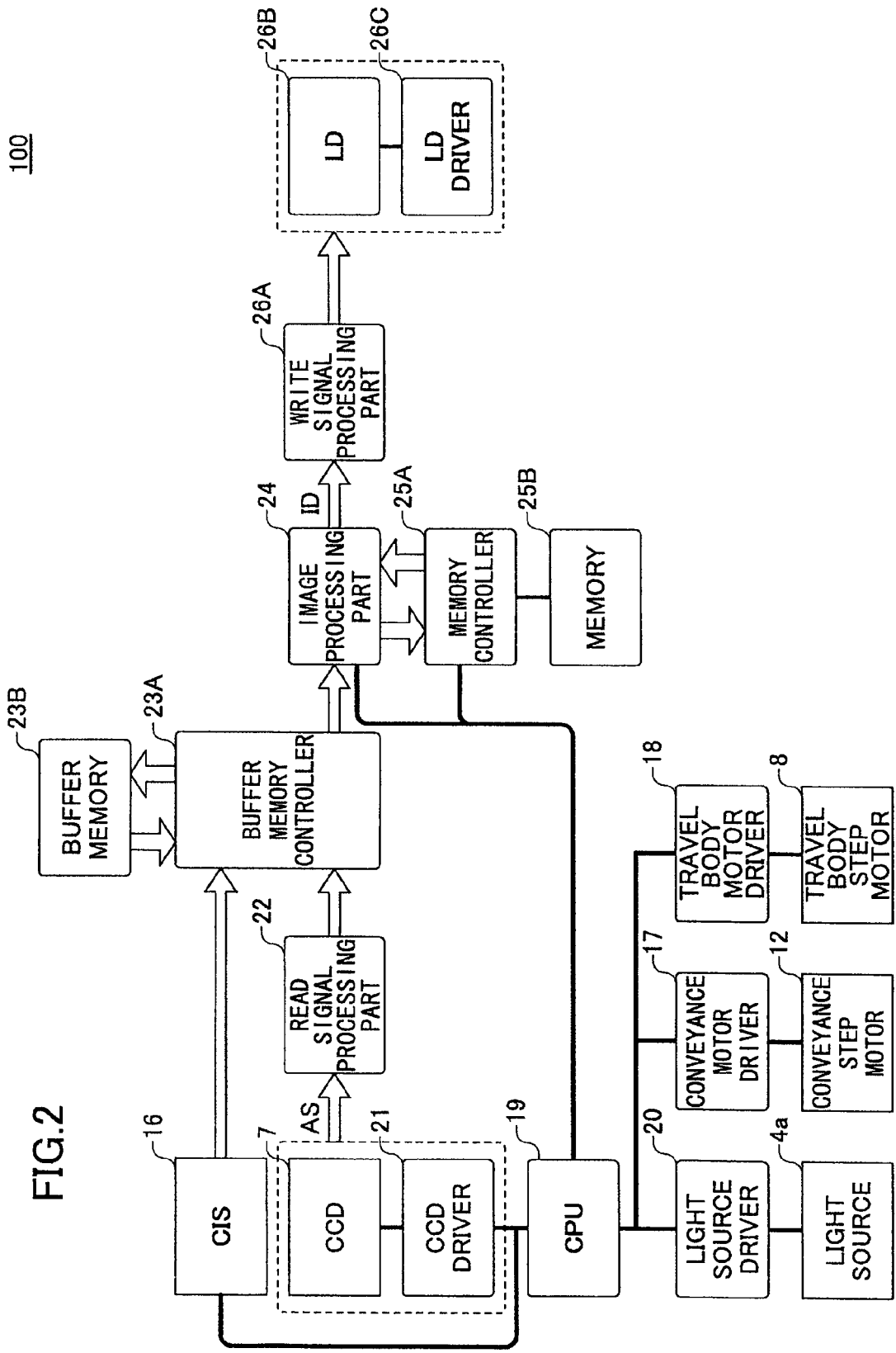
FIG. 2 is a block diagram of electronic installation control of the color multifunction product of the embodiment.

Next, a description is given about a control block of an electric component part of the color MFP. FIG. 2 is a control block diagram of the electric component part of the color MFP of the embodiment. As shown in FIG. 2, the image readout apparatus 100 includes the light source 4a, the CCD 7, the traveling body transfer stepping motor 8, a CIS (i.e., Contact Image Sensor) 16, the manuscript conveyance stepping motor 12, a manuscript conveyance motor driver 17, a traveling body (i.e., carriage) transfer motor driver (i.e., driving device) 18, a control unit (i.e., CPU, Central Processing Unit) 19, a light source driver 20, a CCD driving part 21, a read signal processing part 22, a buffer memory controller 23A, a buffer memory 23B, an image processing part 24, a memory controller 25A, a memory 25B, a write signal processing part 26A, an LD (i.e., Laser Diode) 26B, and an LD driving part 26C.

By using the above-mentioned configuration of the control block, the manuscript 13 of a readout object is read by a process described later according to a control signal from the control unit 19, read data converted from light to electric signals by the CCD 7 and the CIS 16 are transferred to the processing parts through a data bus, and image data processed by predetermined image processing are output into a write device such as a printer. Next, a concrete description is given about the image processing using the above-mentioned configuration of the embodiment.

<Reading Mode: Pressurizing Plate Reading Mode and Manuscript Conveyance Reading Mode>

Figure 3:
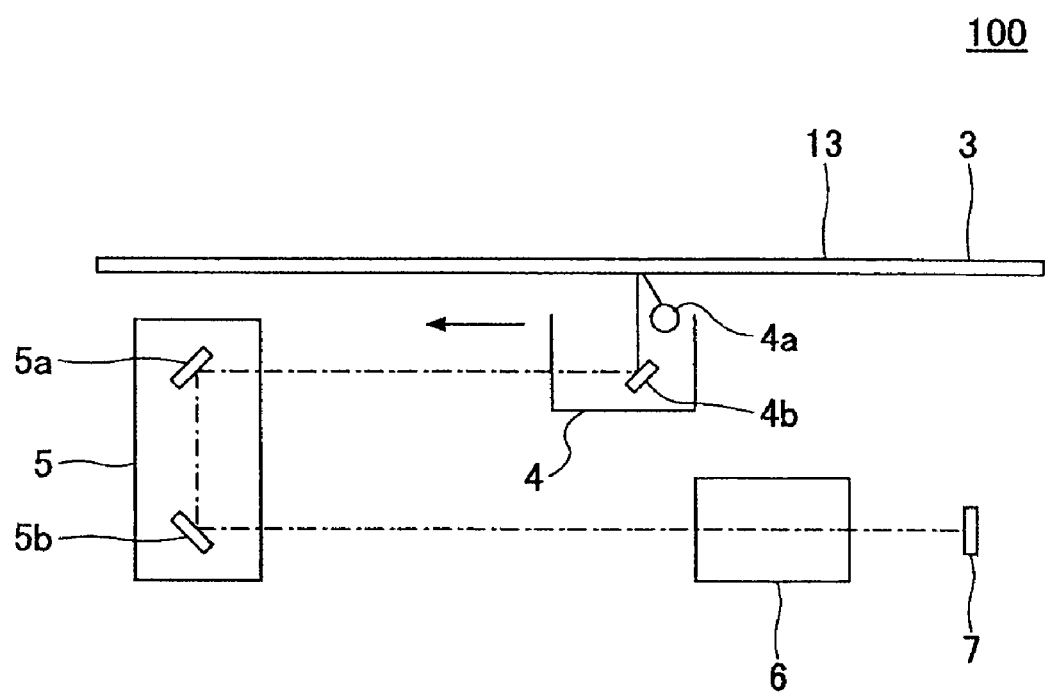
FIG. 3 is a configuration diagram of a manuscript reading part in a pressure plate reading mode of the embodiment.

To begin with, an explanation is given about a pressurizing plate reading mode and a manuscript conveyance reading mode in a reading operation with a scanner. FIG. 3 is a configuration diagram showing a manuscript reading part in the pressurizing plate reading mode of the embodiment. Also, FIG. 4 is a configuration diagram of the manuscript reading part in the manuscript conveyance reading mode of the embodiment.

Figure 4:
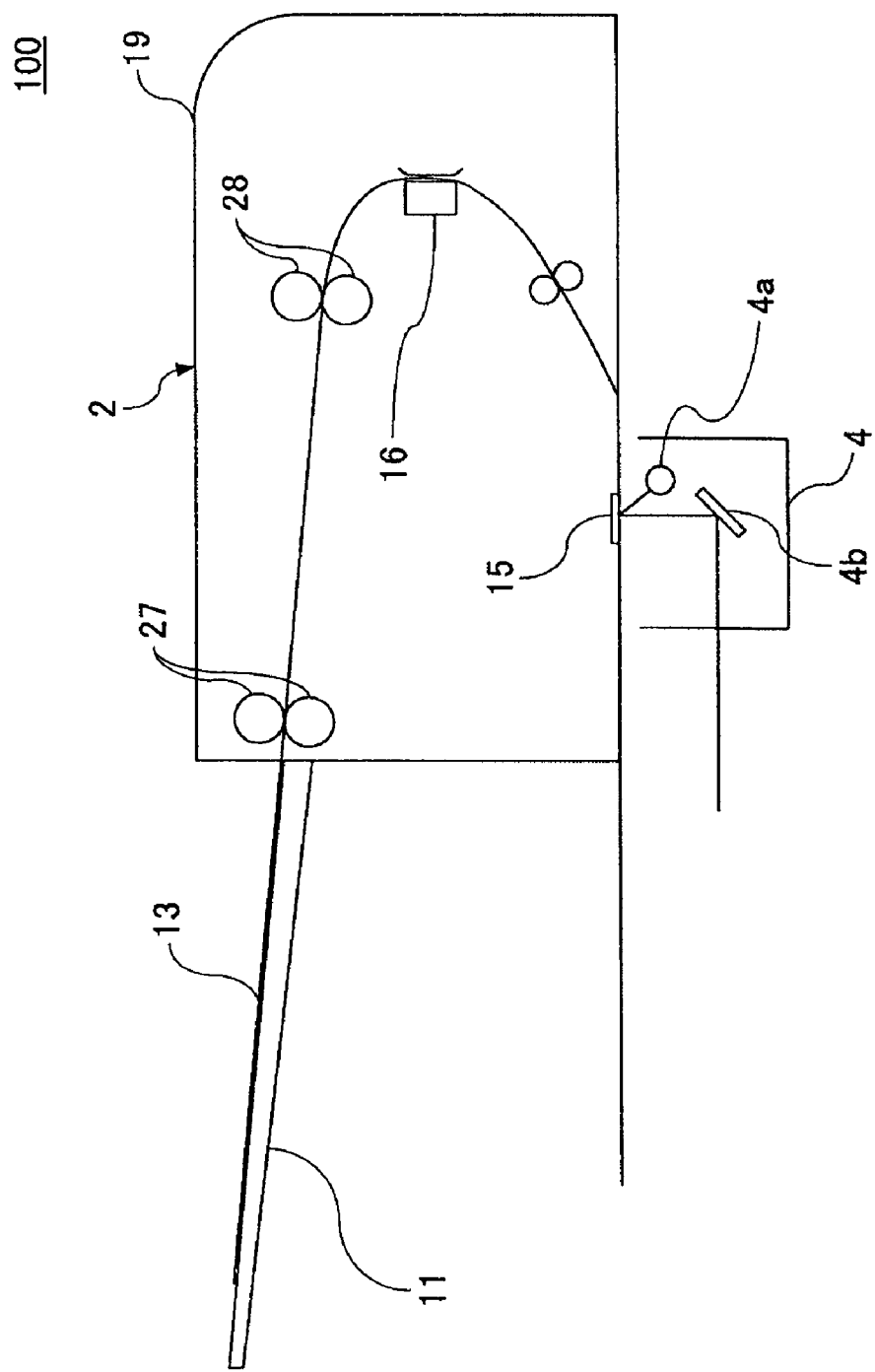
FIG. 4 is a configuration diagram showing a manuscript readout part in a manuscript carrier reading mode of the embodiment.

In a reading operation with the scanner, there are a pressurizing plate reading mode that reads the manuscript 13 by using the manuscript reading board 3 as shown in FIG. 3, and a manuscript conveyance reading mode that fixes a reading position and moves the manuscript 13 by using the manuscript conveyance device 2 as shown in FIG. 4.

<Pressurizing Plate Reading Mode>

A concrete explanation is given about a basic operation of reading the image data in the pressurizing plate reading mode. As shown in FIG. 3, in the operation of pressurizing plate reading mode, the manuscript 13 is set on the manuscript reading board 3 under the manuscript holding plate 14, and then the control unit 19 drives the light source driver 20 and makes the light source 4a turn on.

Figure 6:
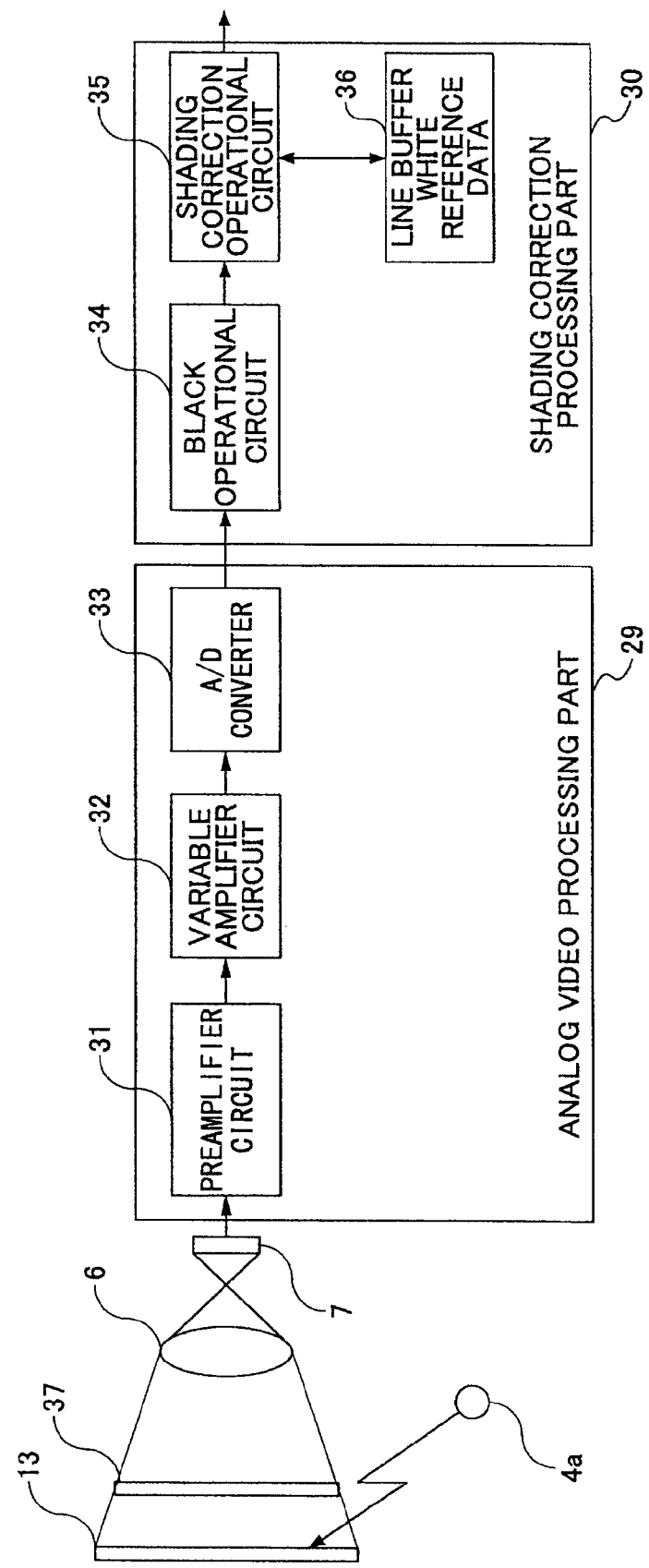
FIG. 6 is a configuration diagram of an analog video processing part and a shading compensation part that constitute the readout signal processing part of the embodiment.

The CCD 7 driven by the CCD driving part 21 scans the reference white plate 15 and reads data, and the read data are converted from analog data to digital data by an A/D converter (which is not shown in drawings) in the readout signal processing part 22 and held by a RAM as white reference data for shading correction (which is shown in FIG. 6 as line buffer white reference data).

The control unit 19 makes the traveling body transfer stepping motor 12 drive by using the traveling body transfer motor driver 18. By this, the first traveling body 4 moves in a direction of the manuscript 13. The first traveling body 4 scans a manuscript surface at a constant speed, by which the image data of the manuscript 13 are converted from light to electric signals by the CCD 7.

<Manuscript Conveyance Reading Mode>

Next, a concrete description is given about a basic operation of reading the image data in a sheet through method (i.e., manuscript conveyance method) DF reading mode. As shown in FIG. 4, the sheet through method DF reading mode is a method to read by moving the manuscript 13 itself, leaving the first traveling body 4 static in a fixed reading position, without reading by fixing the manuscript 13 on the manuscript reading board 3 and by making the first traveling body 4 scan such as the above-mentioned pressurizing plate reading mode.

The control unit 19 causes the first traveling body 4 to scan and read the white reference plate 15 in a predetermined travel distance, and then to travel to a reading position of the sheet through manuscript and to stop at the reading position.

Next, the control unit 19 drives the manuscript conveyance stepping motor 12 by using the manuscript conveyance motor driver 17 for conveying the manuscript 13. The manuscript 13 set on the manuscript board 11 is conveyed to the predetermined reading position of the first traveling body 4 by separation rollers 27 and conveyance rollers 28.

At this time, the manuscript 13 is conveyed at a predetermined speed. The first traveling body 4 scans the manuscript surface of the manuscript 13, remaining stationary, by which the image data of the manuscript 13 are converted from light to electronic signals. The above-mentioned explanation describes a case of reading a one-side manuscript. In a case of reading a both-sides manuscript, a back side of the manuscript 13 is read when the manuscript 13 passes the CIS 16, after the manuscript 13 passes the conveyance rollers 28.

<Readout Signal Processing Part>

Figure 5:
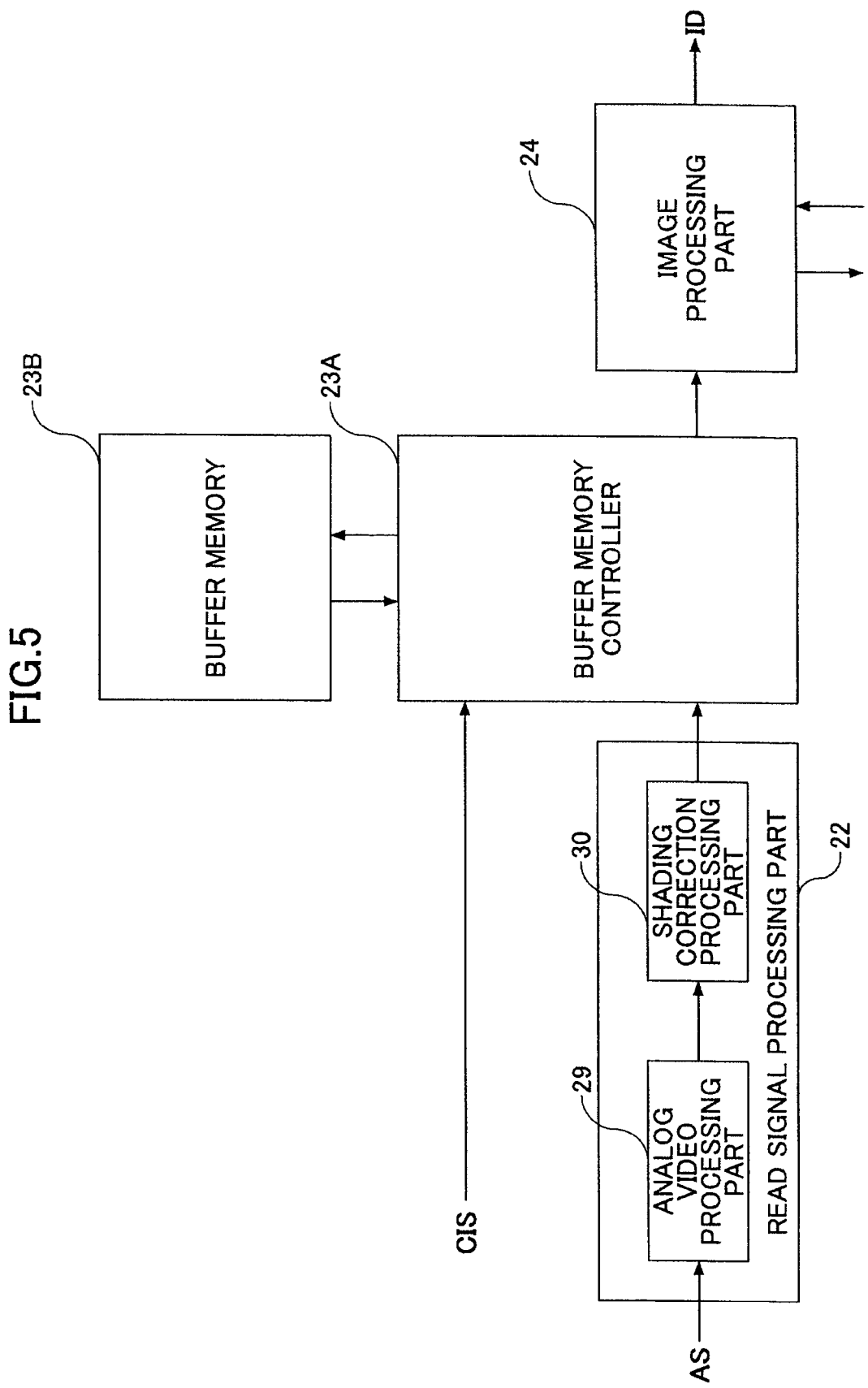
FIG. 5 is a block diagram showing a basic configuration of a readout signal processing part of the embodiment.

Next, a description is given about a readout signal processing part that processes data read by the above-mentioned reading operation. FIG. 5 is a block diagram showing a basic configuration of the read signal processing part of the embodiment.

Here, as shown in FIG. 5, the read signal processing part 22 includes an analog video processing part 29 and a shading correction processing part 30, and outputs data to the image processing part 24A through the buffer memory controller 23A that controls the buffer memory 23B. Moreover, as shown in FIG. 5, an analog video signal AS converted from light to an electric signal by the CCD 7 is converted into a digital signal by the analog video processing part 29, and then shading correction is performed by the shading correction processing part, as correction processing for the readout apparatus.

After the above-mentioned correction processing, the image data are first stored in the buffer memory 23B through the buffer memory controller 23A, and after that, image data of one page are output to the image processing part 24.

The buffer memory controller 23A receives a surface image sent from the CCD 7 and a back side image sent from the CIS 16 at the same time, and stores the image data of two pages in the buffer memory 23B.

After that, the buffer memory 23B alternately outputs the surface image data sent from the CCD 7 and the back side image data sent from the CIS 16 as one page of image data into the image processing part 24. The image processing part 24 performs various kinds of image processing on the image data of one page, and outputs image data ID made by the image processing into the write signal processing part 26A.

<Analog Video Processing Part and Shading Correction Part>

Next, a description is given about the analog video processing part 29 and shading correction processing part 30 that constitute the above-mentioned read signal processing part 22. FIG. 6 is a configuration diagram of the analog video processing part 29 and the shading correction processing part 30 that constitute the read signal processing part 22 of the embodiment.

As shown in FIG. 6, the analog video processing part 29 that processes an analog signal is configured to include a preamplifier circuit 31, a variable amplifier circuit 32 and an A/D converter 33. Furthermore, the shading correction processing part 30 is configured to include a black operational circuit 34, a shading correction operational circuit 35 and a line buffer for white reference data 36.

The line buffer for white reference data 36 stores the above-mentioned white reference data that becomes a reference for the shading correction. As shown in FIG. 6, reflected light from the manuscript 13 on the manuscript reading board 3 irradiated by the light source 4a with light is formed as an image on the CCD 7 by being focused by a lens 6 through a shading adjustment plate 37.

The shading adjustment plate 37 functions to adjust a light amount in order to reduce a reflected light amount difference between a central part and a peripheral part of the CCD 7. This aims to carry out the shading correction operational processing after preliminarily reducing the reflected light amount difference because only an operational result including a lot of distortion in the shading correction processing part 30 is obtained if the reflected light amount difference between the central part and the peripheral part of the CCD 7 is too large. In FIG. 6, a mirror to reflect the reflected light is omitted.

In addition, since the image data sent from the CIS 16 are already processed by a process equivalent to the process that the read signal processing part 22 performs on the image sent from the CCD 7, the analog video processing and the shading correction processing are not needed.

<Configuration Diagram of Image Processing Part>

Figure 7:
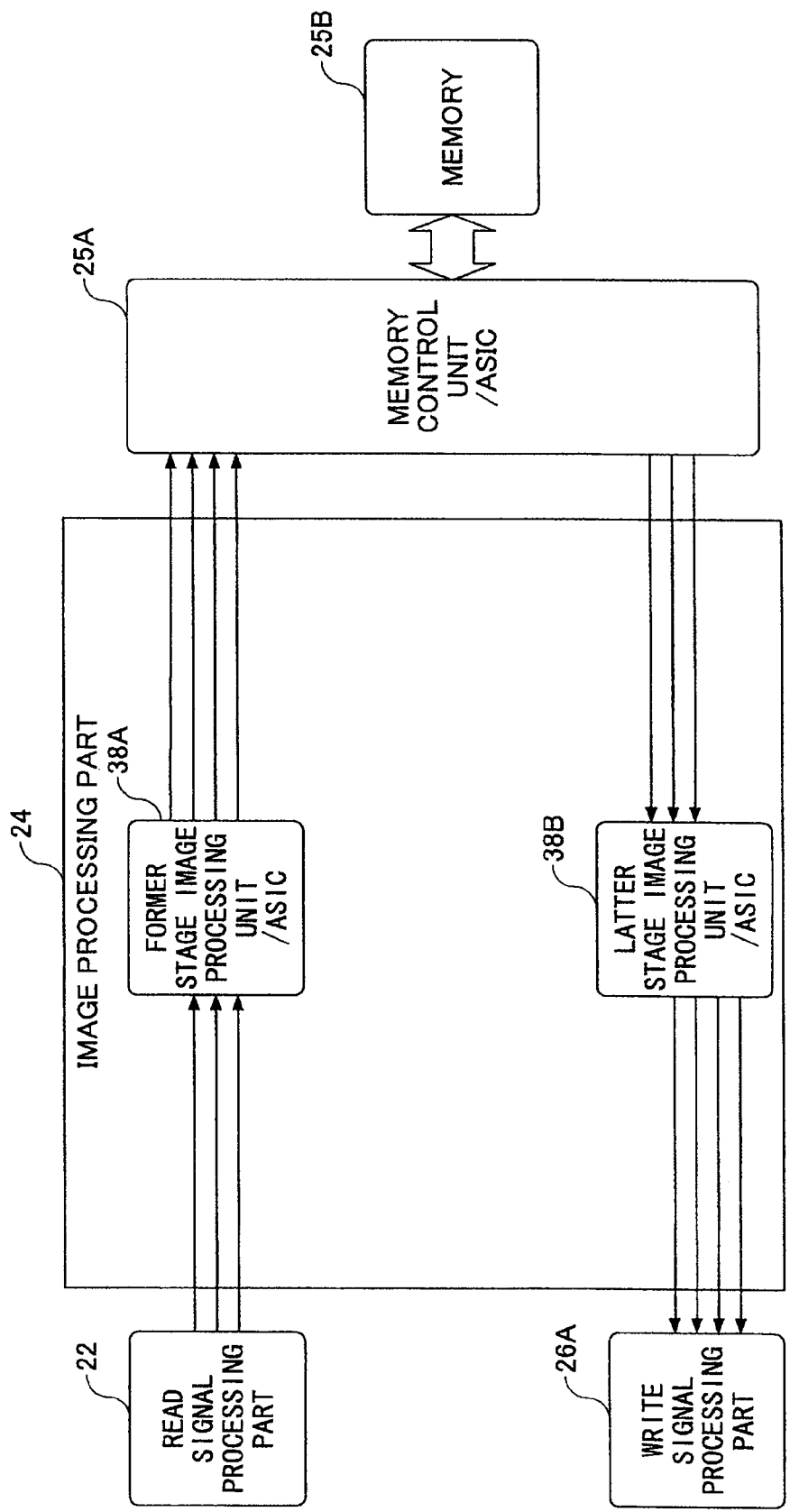
FIG. 7 is a configuration diagram showing an image processing part of the embodiment.
Figure 8:
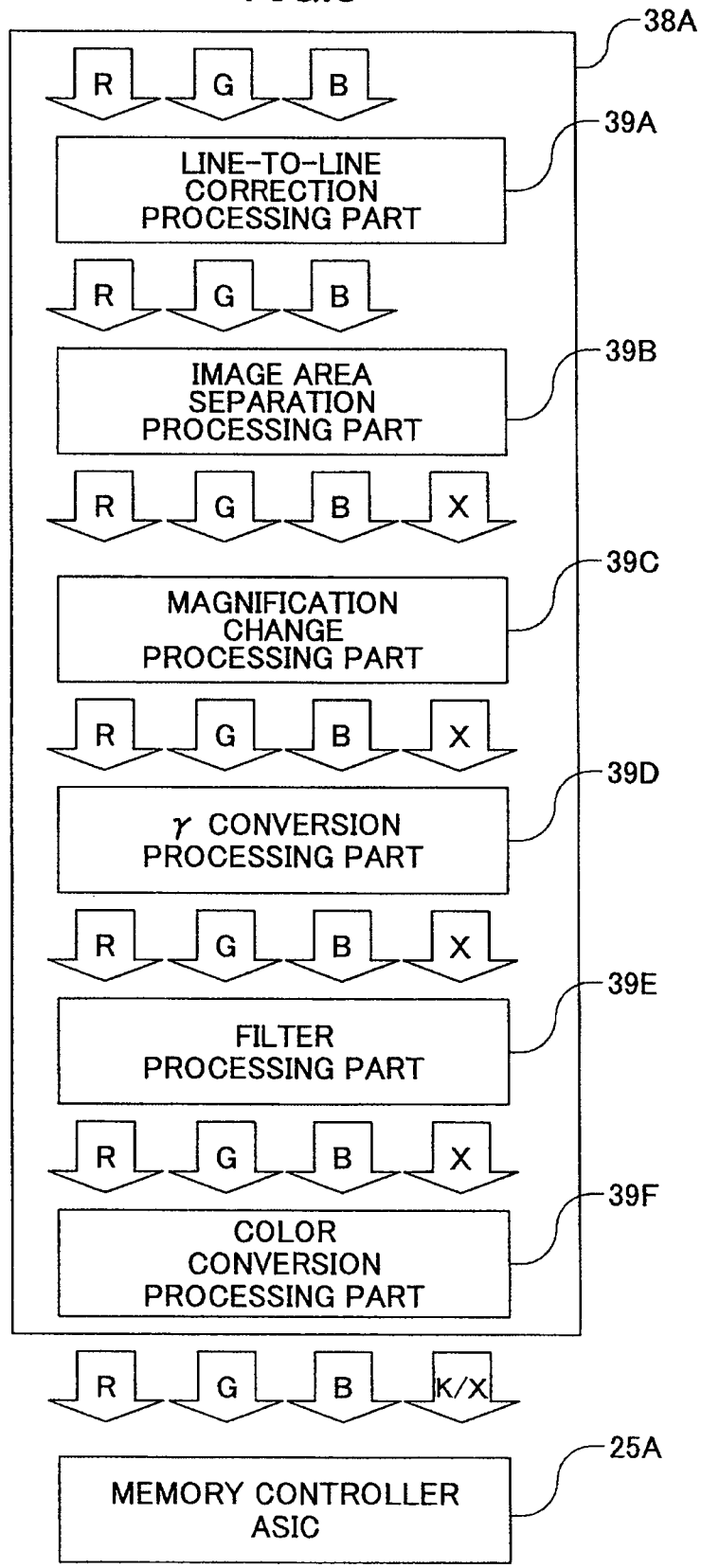
FIG. 8 is a diagram for explaining a process implemented by a former stage image processing unit of the embodiment.
Figure 9:
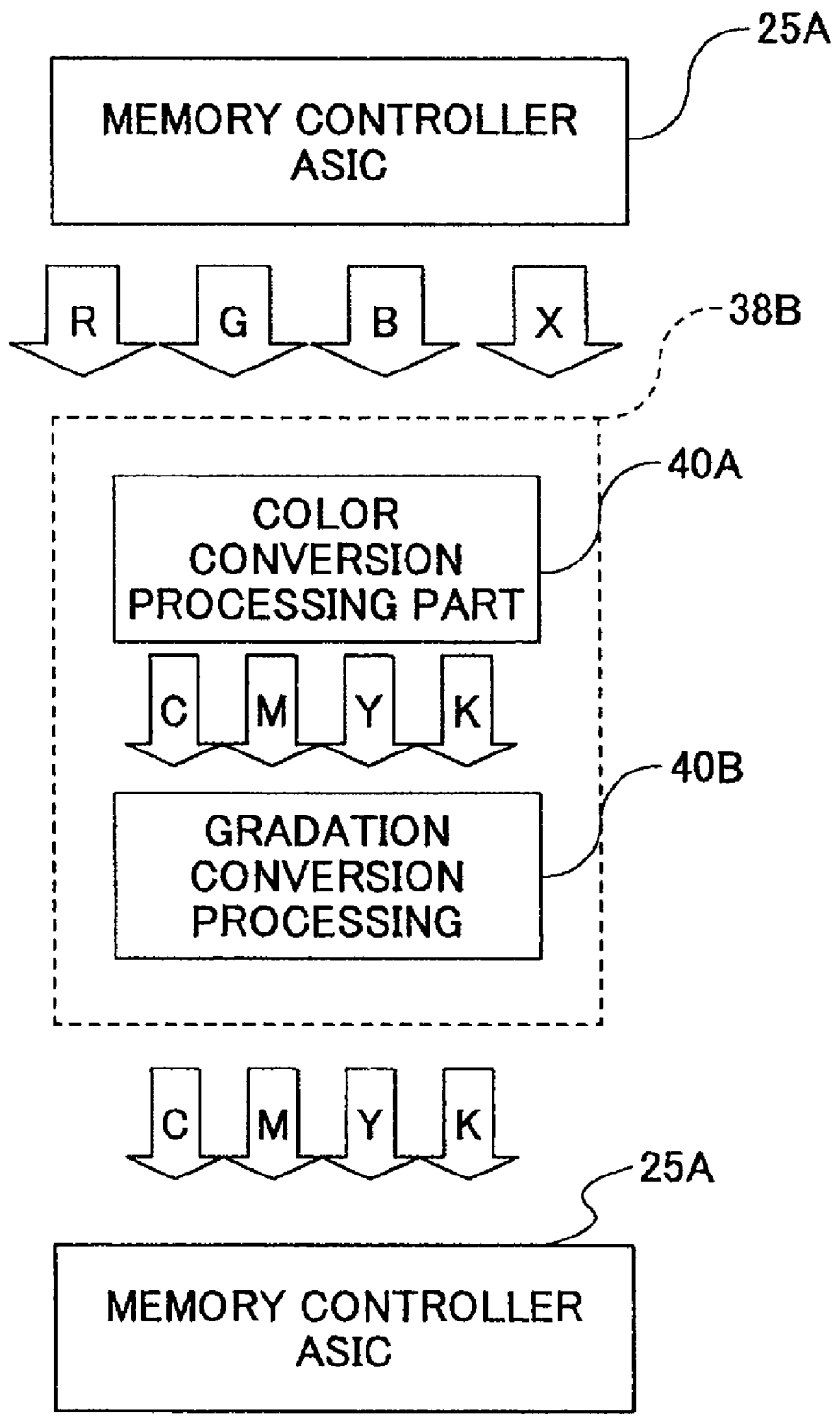
FIG. 9 is a diagram for explaining a process implemented by a latter stage image processing unit of the embodiment.

Next, a description is given about the image processing part 24. FIG. 7 is a configuration diagram of the image processing part 24 of the embodiment. As shown in FIG. 7, the image processing part 24 is configured to include a former stage image processing unit (e.g., ASIC: Application Specific Integrated Circuit) 38A and a latter stage image processing unit (e.g., ASIC) 38B. Moreover, FIG. 8 is a diagram for explaining a process implemented by the former stage image processing unit 38A of the embodiment. Furthermore, FIG. 9 is a diagram for explaining a process implemented by the latter stage image processing unit 38B.

As shown in FIG. 8, the former stage image processing unit 38A is configured to include a line-to-line correction processing part 39A, an image area separation processing part 39B, a magnification change processing part 39C, γ conversion processing part 39D, a filter processing part 39E and a color conversion processing part 39F. The line-to-line correction processing part 39A corrects a line shift between RGB lines caused by a mounting position difference of the RGB lines of the CCD 7. For example, if the B (i.e., Blue) line is made a reference, correction processing is performed to correct the line shift amount between R (i.e., Red) line and the B line, and between G (i.e., Green) line and the B line.

Figure 10:
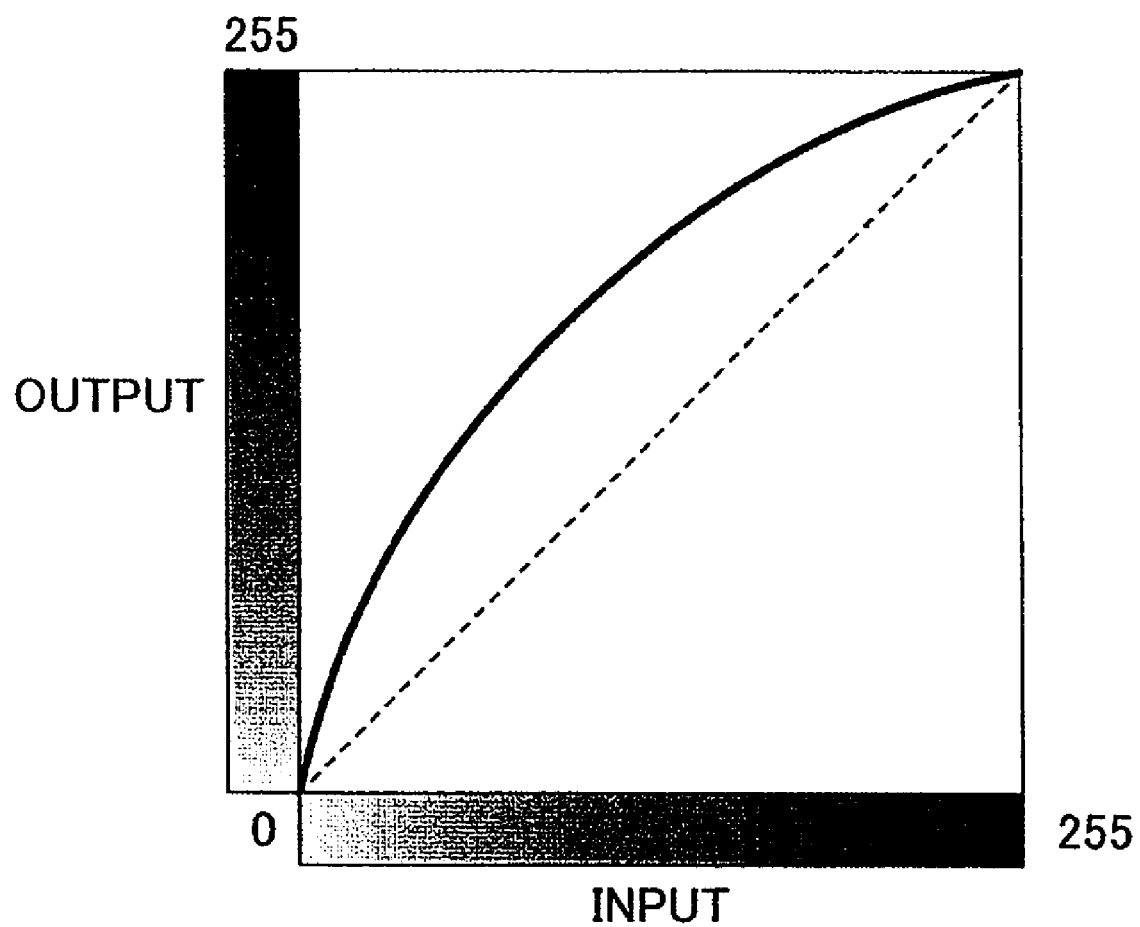
FIG. 10 is a diagram for explaining a density adjustment process of the embodiment.

The image area separation processing part 39B generates image area separation information X about a picture part, a character part, a halftone dot part and the like from a feature of the image data. The magnification change processing part 39C executes a process to convert from a reading resolution to a desired resolution. The γ conversion processing part 39D performs a conversion process to adjust density. Here, FIG. 10 is a diagram for explaining density adjustment processing of the embodiment. Also, FIG. 11 is a diagram for explaining a look-up conversion method of the embodiment.

Figure 11:
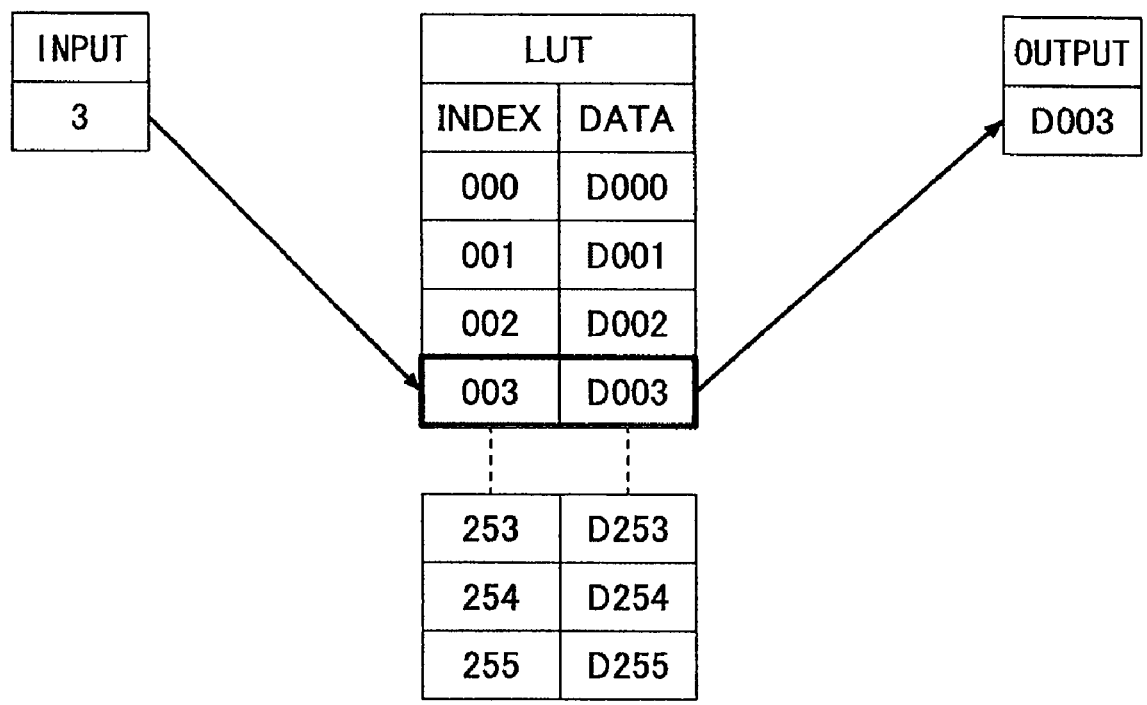
FIG. 11 is a diagram for explaining a look-up conversion method of the embodiment.

The γ conversion processing part 39D carries out conversion processing to adjust the density as shown in FIG. 10, and generally uses a method called a look-up table (i.e., LUT) conversion shown in FIG. 11. As shown in FIG. 11, regarding an output (i.e., data) corresponding to an input (i.e., index), an output value is obtained caused by a density adjustment corresponding to a solid line of FIG. 10, by using a predetermined set table. For example, as shown in FIG. 11, when the input is 3, a corresponding value of D003 in the LUT is output.

Moreover, in FIG. 8, the filter processing part 39E executes a filter processing operation to aim for MTF (i.e., Modulation Transfer Function) correction, sharpening, and smoothing. The color conversion processing part 39F carries out conversion processing into a common color space to be stored by the memory controller 25A. Furthermore, when an auto-color determination is selected, K (which means monochrome or black) data are generated from the RGB data. These monochrome data are simply binarized, and the eight-bit data is packed as eight pixel data.

Four channel image data of RGBK are transferred into the memory controller 25A. In usual color data reading, three channel image data of the RGB are transferred. In other cases, if there is an application that needs separation information such as a PDF (i.e., Portable Document Format) file, the RGB data and the four channel data of the image separation information are transferred to the memory controller 25A.

Here, as shown in FIG. 9, the latter stage image processing unit 38B is configured to include a color conversion processing part 40A and a gradation conversion processing part 40B. The color conversion processing part 40A executes a process to convert from the stored RGB data of input data to a color space of the output device such as a CMYK color space. Here, in a case of color output, the above-mentioned process is performed on the respective RGB components. In a case of monochrome output, the monochrome data are generated from the RGB.

In a gradation conversion by fixed threshold binarization, if a writing device can output image data with one bit and two gray levels, when a binary image is desired, the gradation conversion processing part 40B converts each of the CMYK images with eight bits and 256 gray levels into binary image data with two gray levels and outputs the binary image data into the memory controller 25A as the image data ID. Here, to cite a case of the fixed threshold processing, if a binary threshold is 128, the following binarization is executed to process the pixel data of an input image in the gradation conversion processing part.

If "0≦pixel data<128" is true, then the pixel is set to zero.
If "128≦pixel data<255" is true, then the pixel is set to one.

Next, in a gradation conversion by a fixed threshold of four, if the writing device can output image data with two bits and four values, when a four value image is desired, the gradation conversion processing part 40B converts each of the CMYK images with eight bits and 256 gray levels into four value image data with four gray levels and outputs the four value image data to the memory controller 25A as the image data ID. Here, if an example of the fixed threshold processing is given, the following four value conversion is performed for the pixel data of an input image in the gradation conversion processing part 40B.

If "0≦pixel data<64" is true, then the pixel is set to zero.
If "64≦pixel data<128" is true, then the pixel is set to one.
If "128≦pixel data<192" is true, then the pixel is set to two.
If "192≦pixel data<255" is true, then the pixel is set to three.

<Resolution Instruction Unit>

Next, a description is given about a resolution instruction unit of the embodiment. FIG. 12 is a block diagram showing a configuration of the resolution instruction unit 50 of the embodiment.

As shown in FIG. 12, the resolution instruction unit 50 of the embodiment instructs setting a resolution (i.e., magnification change rate) in a reading speed changing unit 51 and a resolution changing unit 52, according to a control flow of magnification change processing discussed below.

The control unit 19 controls a manuscript line speed of the reading speed changing unit 51 or a moving speed of a reading carriage so as to change a reading resolution into a resolution instructed by the resolution instruction unit 50. Also, the control unit 19 controls the resolution changing unit 52 so as to change a vertical scanning resolution of the image data of which reading resolution is changed by the reading speed changing unit 51 into a resolution in the vertical scanning direction instructed by the resolution instruction unit 50. This allows a data transfer time of one line that transfers on the data bus to be adjusted.

In the embodiment, for example, a data transfer capability that is able to transfer data by the data bus during a readout time of one line is made 8400 bytes, and a maximum readout main scanning size that the image readout apparatus 100 can read is made a transverse long side of A4 size (which means 297 mm). In addition, if a resolution of an image that can be actually obtained by scan reading is made a required resolution, the required resolution ranges from 100 to 600 dpi.

Moreover, as examples of information to specify the pixel (which means a characteristic constituting one pixel), four examples (i.e., first condition through fourth condition) are shown below. The first condition through fourth condition are used for magnification change processing of the resolution instruction unit 50 described below. In the embodiment, four conditions are proposed and described, but the present invention is not limited to the proposed conditions. Moreover, in the embodiment, a deceleration control is not necessary for all of the conditions, and it is possible to switch to the deceleration control in a case of exceeding the data transfer capability.

[First Condition]

R: 8 bits, G: 8 bits, B: 8 bits, X (image area separation information): 8 bits (4 components, 8 bits/component)

[Second Condition]

R: 8 bits, G: 8 bits, B: 8 bits, K (monochrome): 1 bit (3 components, 8 bits/component; 1 component, 1 bit/component)

[Third Condition]

R: 8 bits, G: 8 bits, B: 8 bits (1 component, 8 bits/component)

[Fourth Condition]

K (monochrome): 8 bits

Furthermore, the required resolution in the embodiment is not made independent in main scan and vertical scan but made the same value of resolution. Also, in the embodiment, a data amount scanned and sent during one line readout time through the data bus is, for example, calculated according to an expression of "data amount (bytes)=maximum main scan manuscript size (mm)*required resolution in main scan (dpi)/25.4 (mm/inch)*component number (bytes)".

Here, if the image data amount of one line in main scan calculated by the above expression exceeds 8400 bytes, since data transfer cannot be implemented in a readout time for one line, a deceleration control is needed. In addition, when the deceleration control is switched based on a threshold of the required resolution described below, the threshold of the required resolution differs depending on a relationship between the above-mentioned information to specify the pixels (which includes a component number or a bit number of respective components) and the transfer capability of the data bus. The threshold of the required resolution that needs the deceleration control is calculated as follows.

For example, in the first condition (R: 8 bits, G: 8 bits, B: 8 bits, X: 8 bits), the threshold of the required resolution becomes as follows.

297 mm*179 dpi/25.4*4 components=8,372 bytes 297 mm*180 dpi/25.4*4 components=8,419 bytes From the result of the above-mentioned expression, it can be said that the deceleration control is necessary if the required resolution in main scan is over 180 dpi.

Furthermore, for example, in the second condition (R: 8 bits, G: 8 bits, B: 8 bits, K: 1 bit; here a data size of K becomes ⅛ because K is one bit), the threshold of the required resolution becomes as follows.

297 mm*229 dpi/25.4*3 components+297 mm*180 dpi/25.4*1 component/8=8,368 bytes 297 mm*230 dpi/25.4*3 components+297 mm*180 dpi/25.4*1 component/8=8,404 bytes From the result of the above-mentioned expression, it can be said that the deceleration control is necessary if the required resolution in main scan is over 230 dpi.

In addition, for example, in the third condition (R: 8 bits, G: 8 bits, B: 8 bits), the threshold of the required resolution becomes as follows.

297 mm*229 dpi/25.4*3 components+297 mm*180 dpi/25.4*1 component/8=8,368 bytes 297 mm*230 dpi/25.4*3 components+297 mm*180 dpi/25.4*1 component/8=8,404 bytes From the result of the above-mentioned expression, it can be said that the deceleration control is necessary if the required resolution in main scan is over 240 dpi.

Also, for example, in the fourth condition (K: 8 bits), when the required resolution in main scan is 297 mm*600 dpi/25.4*1 component=7,016 bytes, the deceleration control is unnecessary since the transfer data amount becomes a maximum size.

As discussed above, in the embodiment, because the required resolution that becomes a control condition to switch the deceleration control is calculated by using a maximum main scanning manuscript size, if the manuscript size is less that or equal to the maximum main scanning manuscript size, data transfer is possible. The condition of the magnification change in the deceleration control of this case is constant, and image quality is constant in the same resolution.

<Magnification Change Processing by Resolution Instruction Unit>

Next, a description is given about the magnification change processing by the resolution instruction unit. The resolution instruction unit 50 that operates by a control signal from the control unit 19 (i.e., control module), as above mentioned, implements magnification change processing by instructing setting the resolution (i.e., magnification changing rate) in the reading speed changing unit 51 and resolution changing unit 52.

The reading speed changing unit 51 changes the reading resolution in the vertical direction of the manuscript 13 by changing a conveyance line speed of the manuscript 13 in a scanner (i.e., reading) unit or a moving speed of the reading carriage that reads the manuscript 13, according to the instruction of the resolution by the resolution instruction unit 50. Here, the reading speed changing unit 51 is constructed of the light source driver 20, manuscript conveyance motor driver 17, travel body (i.e., carriage) transfer driver 18 and the like.

The resolution changing unit 52 performs magnification change processing by thinning the vertical scanning line to change the resolution in the vertical scanning direction of the image data of which reading resolution is changed by the reading speed changing unit 51, according to a magnification change rate instruction by the resolution instruction unit 50.

The processing that the resolution changing unit 52 implements corresponds to the processing implemented in the magnification change processing part 39C in FIG. 8 of the image processing part 24 in FIG. 5 that changes the resolution in main scan and vertical scan of the image data to which the magnification change processing of the image processing is implemented, according to interpolation operation processing by an electrical circuit such as the above-mentioned ASIC. The resolution changing unit 52 is constructed of a module that implements magnification change.

Here, the resolution in the vertical scanning direction of the same magnification (i.e., magnification change rate 100%) is made 600 dpi, the moving speed of the manuscript 13 in the case is called "the same times speed". Also, the resolution in the main scanning direction is 600 dpi in a case of the same time speed, and driving of the CCD 7 is controlled based on an operation in the resolution.

In addition, the resolution of the image data is implemented by a combination of the magnification change processing that changes the reading resolution in the vertical scanning direction by changing the conveyance line speed of the manuscript 13 in the reading unit or moving speed of the reading carriage and the interpolation operation processing by the electrical circuit executed by magnification change processing in the image processing unit 24.

<Operation of Magnification Change Processing>

Next, a description is given about an operation of the magnification change processing when the deceleration control is performed according to the threshold of the required resolution calculated in the above-mentioned conditions. Thresholds of the required resolutions used by the resolution instruction change unit 50 in the above-mentioned respective conditions (i.e., first conditions through fourth condition) are shown in FIG. 13 through FIG. 16.

The resolution instruction unit 50 instructs setting the resolution (i.e., magnification change rate) to the reading speed changing unit 51 and the resolution changing unit 52 by using the required resolution. Then, the reading speed changing unit 51 and the resolution changing unit 52 respectively carry out processing according to the instructed resolution, by which magnification change processing is executed. Here, the following magnification changing control methods shown in FIG. 13 through FIG. 16 are respectively named magnification change control methods A through D.

FIG. 13 is a diagram for explaining a threshold of the required resolution used for the magnification change control in the first condition of the embodiment. In a table shown in FIG. 13, "Electronic Magnification Change (1/n Line Thinning)", "Resolution Conversion [dpi] of Magnification Change by Scanner Unit Reading Speed Changing Unit", "Magnification Change Rate [%] of Magnification Change by Scanner Unit Reading Speed Changing Unit", "Data Size of One Line [byte]" and "Data Size at One Line Intervals (Number of One Line Divided by n)] are shown in requested resolution [dpi] ranges.

As mentioned above, in a case of the first condition (4 components (RGBX), 8 bits/component) of magnification change control method A, for example, if the requested resolution in the image reading of the manuscript 13 that is set by a user or on an operation panel exceeds 180 dpi, since the data amount that has to be transferred during a reading interval of one line exceeds 8400 bytes, which is the transfer capability of the data bus, it is necessary to perform the deceleration control.

If such a required resolution is 180 dpi, the resolution instruction unit 50 refers to the threshold of the required resolution in the table of the first condition shown in FIG. 13, instructs the reading speed changing unit 51 to read the manuscript 13 at the reading resolution of 360 dpi data, double of the required resolution, in the vertical scanning direction. Also, the resolution instruction unit 50 instructs the resolution changing unit 52 (i.e., magnification change circuit) to thin out the vertical scanning line of the read data to ½ so as to be 180 dpi of the required resolution.

The control unit 19 controls the reading speed changing unit 51 so that the reading speed changing unit 51 changes a moving speed of the carriage of the scanner unit so as to read at the instructed reading resolution. Moreover, the control unit 19 controls the resolution changing unit 52 so as to thin the data read at the instructed magnification change rate. By doing this, the magnification change processing is executed in the deceleration control. This makes it possible to transfer one line of data by using two lines' time. In other words, it is enough to transfer data of one line in a readout time of two lines, which can double a time to use for reading one line.

In addition, when the required resolution becomes further larger, even if the deceleration control is carried out by thinning the read data to ½ as the above mentioned, data transfer becomes impossible. In such a case, the deceleration control is executed by increasing a thinning rate. Specifically, as shown in FIG. 13, if the required resolution in the main and vertical scanning directions becomes 206 dpi, the data amount of one line increases and becomes 9635 bytes, which is over 8400 bytes of an upper limitation.

Accordingly, the resolution instruction unit 50 instructs the reading speed changing unit 51 to read the manuscript 13 at a reading resolution of 618 data, triple the required resolution in the vertical scanning direction. In addition, the resolution instruction unit 50 instructs the resolution changing unit 52 to thin the vertical scanning lines of the read data to ⅓ and to make the read data 206 dpi of the required resolution. This makes it possible to perform a magnification change processing operation. By doing this, data of one line can be transferred in a readout time of three lines.

As described above, the resolution instruction unit 50 instructs the reading speed changing unit 51 to read the manuscript 13 at reading resolution of n times data of the required resolution in the vertical scanning direction. Moreover, the resolution instruction unit 50 instructs the resolution changing unit 52 to thin the read data in vertical scanning line to 1/n. According to the instructions, the deceleration control is performed so as to operate each of the magnification change processing, and in the deceleration control, one line of data is sent by using a time for n lines. At this time, the thinning number increases as the required resolution increases, but contents of the magnification change processing are similar to the above description.

Furthermore, FIG. 14 is a diagram for explaining a threshold of the required resolution used for a magnification change control in the second condition of the embodiment. FIG. 15 is a diagram for explaining a threshold of the required resolution used for a magnification change control in the third condition of the embodiment. FIG. 16 is a diagram for explaining a threshold of a magnification change control in the fourth condition of the embodiment.

In respective conditions (i.e., conditions 2 through 4) shown in FIG. 14 through FIG. 16, a threshold changes depending on a data amount and the like, but the control substance (magnification control methods B through D) is similar to the method described in the first condition of FIG. 13.

In this way, the resolution instruction unit 50 instructs setting a resolution (magnification change rate) in the reading speed changing unit 51 and the resolution changing unit 52, according to a data size derived by using the above-mentioned maximum readout size of the manuscript 13 in the main scanning direction and the information to specify a pixel. The reading speed changing unit 51 and the resolution changing unit 52 are controlled to follow the instructions, by which it is possible to adjust a necessary time for one line of data transfer that transfers on the data bus.

Here, under the above-mentioned respective conditions (i.e., first condition through fourth condition) shown in FIG. 13 through FIG. 16, when the deceleration control is not carried out, the image data are transferred on the data bus without executing the thinning magnification change processing by the electrical magnification change, leaving the reading resolution read by the scanner unit.

<Flow Chart of Magnification Change Processing>

Figure 17:
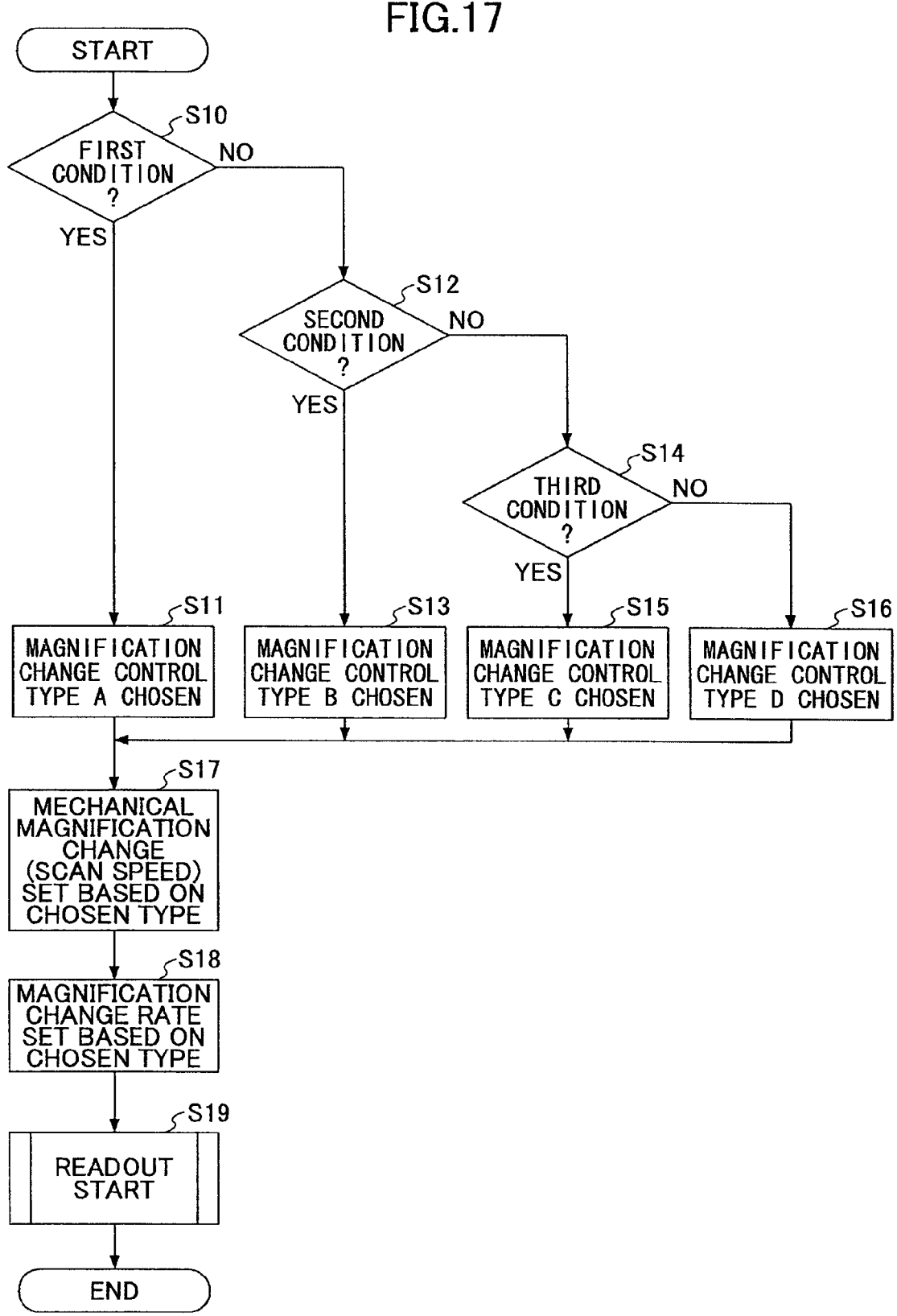
FIG. 17 is a flowchart of a magnification changing process of the embodiment.

Next, a description is given about a control flow of the magnification change processing by the resolution instruction unit 50. FIG. 17 is a diagram showing a flow chart of the magnification change processing of the embodiment. In the flow chart shown in FIG. 17, an example of performing the magnification change processing under any of the first condition through fourth condition is shown, but the present invention is not limited to the embodiments.

The resolution instruction unit 50 determines whether the information to specify one pixel of the image data to be transferred applies to the first condition (S10). When the first condition is applicable (YES in S10), the resolution instruction unit 50 selects the magnification change control method A corresponding to the first condition shown in FIG. 13 (S11).

Moreover, if the information to specify one pixel of the image data to be transferred does not apply to the first condition in step S10 process (NO in S10), the resolution instruction unit 50 determines whether the information applies to the second condition (S12 in FIG. 17).

Here, when the information applies to the second condition (YES in S12), the magnification change control method B corresponding to the second condition shown in FIG. 14 is selected (S13 in FIG. 17). Furthermore, in S12 process, when the information to specify one pixel of the image data to be transferred does not apply to the second condition (NO in S12), the resolution instruction unit 50 determines whether the information applies to the third condition (S14). When the information applies to the third condition (YES in S14), the magnification change control method C corresponding to the third condition shown in FIG. 15 is selected (S15 in FIG. 17).

In addition, when the information to specify one pixel of the image data to be transferred does not apply to the third condition (YES in S14), the resolution instruction unit 50 selects the magnification change control method D corresponding to the fourth condition shown in FIG. 16 (S16 in FIG. 17).

Next, the resolution instruction unit 50 sets a mechanical magnification change (i.e., scanning speed) of the scanner unit for the reading speed changing unit 51, according to the magnification change control method selected in the selected one of the processes of S11, S13, S15 and S16 (S17). Also, the resolution instruction unit 50 sets the magnification change rate for the resolution changing unit 52, according to the selected magnification change control method as well as S17 (S18). Next, a reading operation is started (S19) according to the set magnification change control method, and the process is finished.

Here, for example, if the print data transfer is started during the scanner data transfer, it may be possible that the scanner data transfer cannot be used or that printer data transfer cannot be started during the scanner data transfer.

Accordingly, in order to simultaneously operate scanning and printing it is allowed to preliminarily calculate a data amount used for a print operation and to set a threshold of the required resolution used for switching the deceleration control on the basis that the data amount cannot be used.

For example, if the data transfer capability that can transfer data by data bus during the readout time of one line is made 8400 bytes, and a maximum value of a data transfer amount used for the printer is made 2000 bytes, "8400−2000=6400 bytes" can be made the data transfer capability available for the scan data transfer. Based on the data transfer capability, it may be preferable to calculate the threshold of the required resolution of switching the deceleration control and to make a table for the magnification change control switching corresponding to FIG. 13 through FIG. 16.

As discussed above, according to the embodiment, by providing the switching conditions of the deceleration control combined with the information to specify one pixel and the plural thresholds of the requested resolution, it is possible to prevent readout productivity decline when the deceleration control is unnecessary, to read the manuscript 13 by using the deceleration control even if the manuscript size is unknown before reading the manuscript 13, and to make the same quality image without being affected by the data transfer amount.

In addition, regarding the information to specify one pixel, because the data amount capable of transferring the data varies depending on, for example, not only a color component such as RGB or CMY, but also the bit number of each of the components, by providing the switching condition of the deceleration control where the bit number of each of the components is considered as well as the components, it is possible to switch control finely compared to just a color mode.

Moreover, regarding the information to specify one pixel, by considering not only the color components such as RGB or CMK but also four components of RGB data and monochrome data, it is possible to switch control finely in such an image that there are mixed RGB and monochrome data in one pixel in readout of the automatic control determination.

Furthermore, concerning the information to specify one pixel, by considering not only the above-mentioned color components but also the RGB data and the image area separation information, it is possible to switch control finely in such an image that there are mixed color data and image area separation data in one pixel in a PDF file generated with the image area separation information.

In addition, the resolution changing unit 52 in the vertical direction that changes the resolution by interpolation operation processing with an electrical circuit performs magnification change processing by thinning the vertical scanning line, so that it is possible to adopt a simpler circuit configuration than an operational circuit using a convolution method and the like.

Also, in a case of a versatile data bus, which is used for data transfer other than read data transfer by the scanner, by considering a data transfer amount of the data bus in another process, it is possible to resolve stopping a scanning operation by use of the data bus by other than the scanning operation or stopping an operation other than the scanning operation by use of the data bus.

Moreover, in a case of an MFP and the like, whose data bus is used for data transfer in a print operation other than read data by the scanner, by considering a data transfer amount used for data transfer of a print operation other than read data by the scanner, it is possible to resolve stopping of a scanning operation by use of data bus for a print outputting or stopping a print outputting by the use of the data bus for the scanning operation.

Furthermore, by considering the component number of the color and the bit number of one component as the information to specify one pixel, the following problems can be solved: a problem of reducing readout productivity when the deceleration control is switched over at a main scanning resolution more than or equal to a necessary threshold because the resolution more than or equal to the threshold becomes the deceleration control; a problem of reducing color readout productivity when the deceleration control is switched over depending on color or monochrome because the color becomes the deceleration control at all resolutions; a problem where a mere combination of a color mode and the resolution cannot adapt to various image processing systems when the deceleration control is switched over depending on a main scanning resolution and the color or monochrome because the method to specify one pixel varies depending on image processing system structures.

In addition, as an embodiment to practice the present invention, it is possible to configure a resolution instruction program to cause an image processing apparatus to practice the above-mentioned respective processing types of the resolution instruction unit and to realize the same function as the above-mentioned processing by installing the resolution instruction program, for example, on a computer. Also, as another embodiment to practice the present invention, by causing the image processing apparatus to read a recording medium that records the resolution instruction program, it is possible to cause the image processing apparatus to implement the read resolution instruction program.

As mentioned above, according to the present invention, it is possible to perform optimal data transfer depending on a network transfer capability.

The present invention is not limited to the specifically disclosed embodiments, and variations and modifications may be made without departing from the scope of the present invention.

The present application is based on Japanese Priority Patent Application No. 2009-112010, filed on May 1, 2009, the entire contents of which are incorporated herein by reference.

What is claimed is:

1. An image processing apparatus comprising:
a reading speed changing unit to change a reading resolution of a manuscript in a vertical direction by changing a carrier linear speed of the manuscript or a moving speed of a reading carriage to read the manuscript;
a resolution changing unit to change a resolution in the vertical direction of image data of which reading resolution is changed by the reading speed changing unit; and
a resolution instruction unit to calculate a threshold of a required resolution of an image to determine instruction contents for the reading speed changing unit and the resolution changing unit, the threshold being calculated based on a data size drawn from a maximum readout size of the manuscript in a main scanning direction and information to specify a pixel and data transfer capability of a data bus to transfer the image data, and to provide an instruction on a resolution for the reading speed changing unit and the resolution changing unit according to the calculated threshold of the required resolution.

2. The image processing apparatus as claimed in claim 1, wherein the resolution instruction unit instructs setting the reading resolution corresponding to a set required resolution of an image according to the threshold of the required resolution of the image, and instructs the resolution change unit to change the image data of which reading resolution is changed into the set required resolution of the image.

3. The image processing apparatus as claimed in claim 1, further comprising:
a control unit to control the carrier linear speed or the moving speed of the reading speed changing unit so as to read at the reading resolution instructed by the resolution instruction unit, and to adjust a data transfer time to transfer the image data of one line on the data bus by controlling the resolution changing unit so as to change the image data of which reading resolution is changed into the resolution instructed by the resolution instruction unit.

4. The image processing apparatus as claimed in claim 1, wherein the information to specify the pixel includes a number of color components and a bit number of each of the color components.

5. The image processing apparatus as claimed in claim 1, wherein the information to specify the pixel includes four components of red, green, blue and monochrome data.

6. The image processing apparatus as claimed in claim 1, wherein the information to specify the pixel includes four components of red, green, blue data and image area separation information.

7. The image processing apparatus as claimed in claim 1, wherein the resolution change unit performs magnification change processing by thinning a vertical scanning line.

8. The image processing apparatus as claimed in claim 1, wherein a data transfer size including print data transferred by the data bus is added to the data size.

9. An image processing method to transfer image data of a manuscript according to a required resolution of an image to be output, the method comprising:
calculating a threshold of the required resolution of the image to determine a reading speed and a resolution of the image data in a vertical direction, the threshold being calculated based on a data size drawn from a maximum readout size of the manuscript in a main scanning direction and information to specify a pixel and data transfer capability of a data bus to transfer the image data;
changing a reading resolution of the manuscript in the vertical direction by changing a carrier linear speed of the manuscript or a moving speed of a reading carriage to read the manuscript, according to the calculated reading speed;
reading the manuscript to obtain the image data of the manuscript of the changed resolution;
changing the resolution in the vertical direction of the image data of which reading resolution is changed; and
transferring the image data of which resolution in the vertical direction is changed by using the data bus.

* * * * *